United States Patent [19]

Ward et al.

[11] Patent Number: 4,543,795
[45] Date of Patent: Oct. 1, 1985

[54] TEMPERATURE CONTROL FOR VEHICLE CABIN

[75] Inventors: David R. Ward, Byron; William E. Zieske, Rockford, both of Ill.

[73] Assignee: Kysor Industrial Corporation, Cadillac, Mich.

[21] Appl. No.: 629,952

[22] Filed: Jul. 11, 1984

[51] Int. Cl.[4] ............................................. G05D 23/32
[52] U.S. Cl. ..................................... 62/158; 62/323.4; 361/98
[58] Field of Search ............... 330/207 P, 298; 361/98, 361/87; 62/229, 323.4, 158; 236/78 R

[56] References Cited

U.S. PATENT DOCUMENTS

| 3,616,846 | 11/1971 | Wills | 165/26 |
| 3,663,863 | 5/1972 | Arimura et al. | 361/98 X |
| 3,845,405 | 10/1974 | Leidich | 361/98 X |
| 4,301,490 | 11/1981 | Nagel et al. | |

Primary Examiner—William E. Wayner
Attorney, Agent, or Firm—Price, Heneveld, Huizenga & Cooper

[57] ABSTRACT

The specification discloses a vehicle cabin temperature control including a thermostat and a power circuit responsive thereto for selectively applying electrical power to a heating/cooling device. The control further includes a protection circuit coupled to the power circuit for interrupting the power applied to the heating/cooling device when a short-circuit is detected.

6 Claims, 2 Drawing Figures

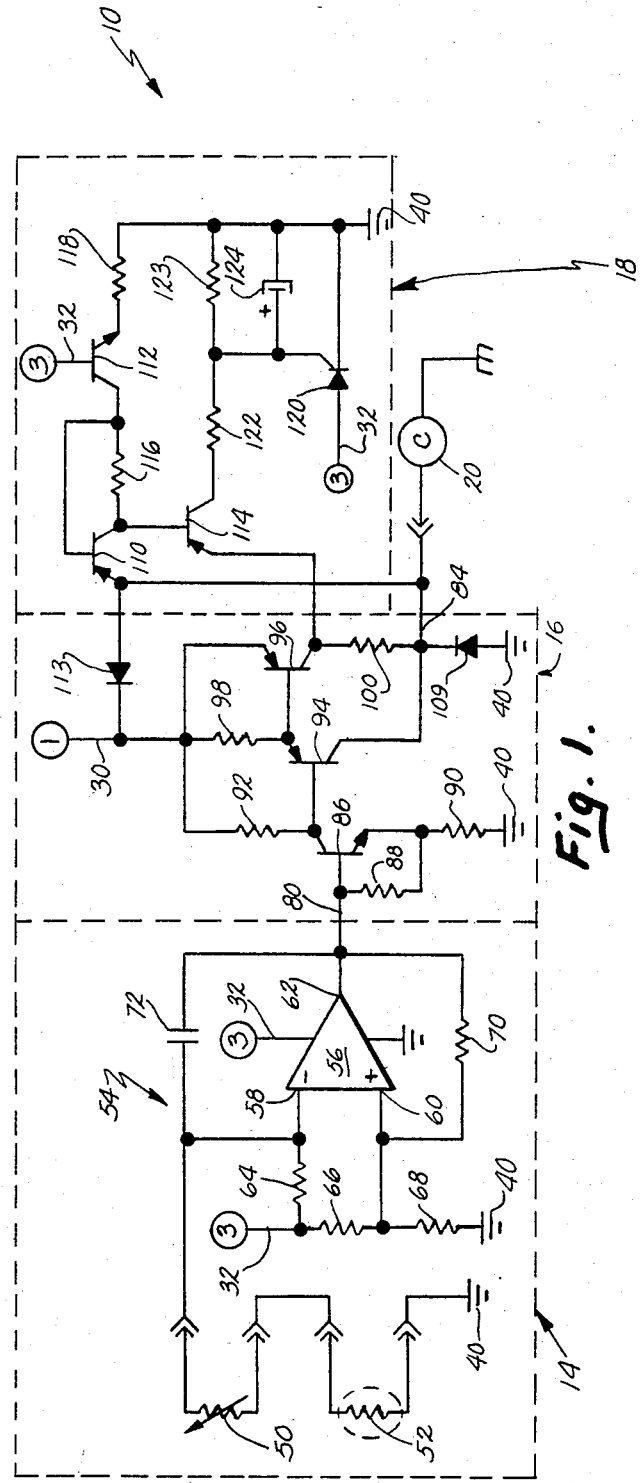
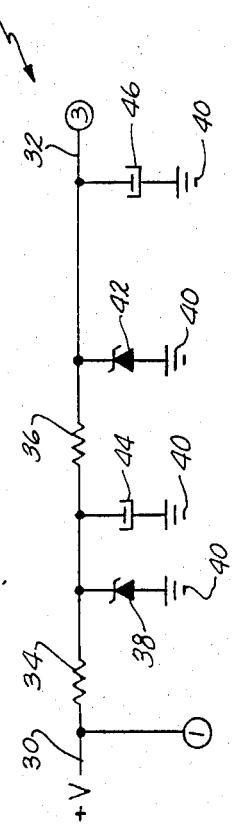
Fig. 1.
Fig. 2.

4,543,795

TEMPERATURE CONTROL FOR VEHICLE CABIN

BACKGROUND OF THE INVENTION

The present invention relates to temperature controls, and more particularly to temperature controls for vehicle cabins.

A wide variety of controls has been developed for regulating the temperature within the cabin of a vehicle such as a truck tractor or agricultural vehicle. Such temperature controls improve the comfort of the cabin by maintaining the temperature at or near a preselected value.

One particularly efficient air conditioning temperature control has been previously sold by the assignee of the present application. This control includes a thermostat portion outputting a signal indicative of the relation between a selected temperature and the actual temperature within the cabin and an output circuit responsive to the thermostat portion for powering the air conditioner compressor clutch when cooling is required. Although this control constituted a noteworthy advance in vehicle cabin controls, it was not without its drawbacks. Perhaps most importantly, this control applied electrical power to the compressor clutch whenever the actual cabin temperature exceeded the desired cabin temperature. Consequently, if a short-circuit condition existed within the compressor clutch circuit, this control continued to apply power to the clutch, possibly causing the clutch to burn out. Such possibility is, of course, undesirable in a commercial deployment.

SUMMARY OF THE INVENTION

The aforementioned problems are overcome by the present invention. Essentially, a vehicle cabin temperature control is provided for regulating the temperature within a vehicle cabin by efficiently and safely controlling an electrically actuated heating/cooling device. The temperature control continually monitors for a short-circuit condition through the heating/cooling device (e.g., air conditioner compressor clutch) and interrupts power applied thereto when a short-circuit is detected. Accordingly, the present temperature control greatly enhances the safety and comfort of the vehicle.

More particularly, the vehicle cabin temperature control includes a thermostat circuit for emitting a signal responsive to a comparison of the desired cabin temperature and the actual cabin temperature, and a power circuit responsive to the thermostat circuit for applying electrical power to a heat/cooling device when the thermostat signal assumes an undesired value. The control further includes a current monitoring circuit responsive to the amount of electrical current applied to the heating/cooling device for interrupting the electrical power applied thereto when a short-circuit situation is detected.

These and other objects, advantages, and features of the invention will be more readily understood and appreciated by reference to the detailed description of the preferred embodiment and the drawings.

BRIEF DESCRIPTION OF THE DRAWINGS

FIG. 1 is a schematic diagram illustrating the vehicle cabin temperature control of the present invention; and FIG. 2 is a schematic diagram of the power source for the voltage comparator of the temperature control.

DETAILED DESCRIPTION OF THE PREFERRED EMBODIMENT

A vehicle cabin temperature control constructed in accordance with a preferred embodiment of the invention is illustrated in the drawings and generally includes control circuit 10 (FIG. 1) and power source 12 (FIG. 2). Control circuit 10 in turn includes thermostat circuit 14, power circuit 16, and short-circuit protection circuit 18. Thermostat circuit 14 enables a desired temperature within the vehicle's cabin to be selected, and the circuit emits a signal responsive to a comparison of the desired and actual temperatures. Output circuit 16 is responsive to thermostat circuit 14 and applies power to air conditioner compressor clutch 20 when cooling is required. Shor-circuit protection circuit 18 monitors the current flowing to and through clutch 20 and interrupts the power applied thereto when a short-circuit condition is detected. In the preferred embodiment, a short-circuit condition is assumed to exist if more than seven amps of current are flowing through clutch 20.

Power source 12 (FIG. 2) is of conventional design and provides a regulated voltage source for thermostat circuit 14. Power circuit 12 includes input line 30 coupled to the vehicle voltage source (not shown) and output line 32 coupled both to thermostat circuit 14 and protection circuit 18 (see also FIG. 1). A pair of voltage dropping resistors 34 and 46 are coupled in series with one another between input lines 30 and output line 32. Zener diode 38 is electrically coupled at a first end between resistors 34 and 36 and at a second end to ground 40. Zener diode 42 is coupled between output line 32 and ground 40. Both diodes 38 and 42 preregulate overvoltage conditions. Similarly to diode 38, capacitor 44 is electrically coupled at a first end between resistors 34 and 36 and at a second end to ground 40. Similarly to diode 42, capacitor 46 is electrically coupled between output line 32 and ground 40. Both capacitors 44 and 46 reduce voltage fluctuations between input line 30 and output line 32. Power source 12 therefore delivers a relatively uniform reference voltage on output line 32.

Thermostat circuit 14 (FIG. 1) includes set-point potentiometer or "pot" 50, temperature sensor 52, and temperature comparator 54. Potentiometer 50 is a 10 KOhm pot, while temperature sensor 52 is a resistive temperature sensing element having a resistance of 16 KOhms at 32° F. As is generally well-known to those having ordinary skill in the art, the resistance of element 52 decreases as the temperature thereof increases, and conversely the resistance increases as the temperature thereof decreases.

Temperature comparator 54 includes op amp 56 including inverting input 58, noninverting input 60, and output 62. In the preferred embodiment, op amp 56 is Model LM358 made by Motorola. Op amp 56 is configured as a voltage comparator and includes a pair of voltage divider networks. The first network includes pot 50, sensor 52, and resistor 64. Pot 50 and sensor 52 are coupled in series with one another between ground 40 and input port 58 of op amp 56. Resistor 64 is electrically coupled between power supply output line 32 and inverting input 58. The second voltage divider network includes resistors 66 and 68 equal in resistance to one another. Resistor 68 is coupled between ground 40 and noninverting input 60. Resistor 66 is coupled between output line 32 and noninverting input 60. Feedback resistor 70 is coupled between output 62 and noninverting input 60, while capacitor 72 is coupled between output 62 and inverting input 58. Feedback resistor 70 controls hysteresis of temperature comparator 54.

Output circuit 16 (FIG. 1), includes control input line 80 coupled to op amp output 62, power input line 30 coupled to the vehicle electrical system, and power output line 84 coupled to clutch 20. Transistor 86 and resistor 88, 90, and 92 together comprise a voltage amplifier, which acts as a buffer between op amp 56 and output transistor 94 and 96 of output circuit 16. The collector of transistor 86 is coupled through resistor 92 to power input line 30. The emitter of transistor 86 is coupled to ground 40 through transistor 90. Additionally, the emitter is coupled through resistor 88 to control input line 80, which is also coupled to the base of transistor 86.

Output transistors 94 and 96 (FIG. 1) are arranged in a Darlington configuration to selectively apply power from input line 30 to output line 84. The base of transistor 94 is coupled to the collector of transistor 86; and similarly, the base of transistor 96 is coupled to the collector of transistor 94. The collector of transistor 94 is electrically coupled to input line 30 through resistor 98, while the collector of transistor 96 is directly coupled to input line 30. The emitter of transistor 94 is coupled directly to output line 94, while the emitter of transistor 96 is electrically coupled through resistor 100 to power output line 84.

Power line 84 of output circuit 16 is coupled to air conditioner compressor clutch 20, which is generally well-known to those having ordinary skill in the art. Alternatively, clutch 20 could be virtually any electrically powered heating/cooling device or component thereof. Output line 84 is also coupled to ground 40 through diode 109.

Short-circuit protection circuit 18 (FIG. 1) is electrically coupled to output circuit 16 to monitor for a short-circuit through clutch 20 and interrupt power applied to the clutch in case thereof. Circuit 18 includes three transistors 110, 112, and 114. The collector of transistor 110 is coupled through diode 113 to power input line 30 and is further coupled directly to output line 84. The collector of transistor 110 is coupled through resistor 116 to the collector of transistor 112. The base of transistor 110 is coupled directly to the collector of transistor 112. The emitter of transistor 112 is coupled through resistor 118 to ground 40. The base of transistor 112 is coupled to power supply output line 32 (see also FIG. 2). The emitter of transistor 114 is coupled to the collector of transistor 96, while the emitter of transistor 114 is electrically coupled to the control port of silicon controlled rectifier (SCR) 120 through resistor 122. The base of transistor 114 is coupled directly to the emitter of transistor 110. The power input of SCR 120 is coupled to power supply output line 32 (see also FIG. 2), while the power output of SCR 120 is coupled directly to ground 40. An R-C time delay includes resistor 122 and capacitor 124 which are coupled in parallel with one another between the control port of SCR 120 and ground 40.

In the preferred embodiment, the resistors have the following resistances:

| Designating Numeral | Resistance |
| --- | --- |
| 34 | 560 Ohms |
| 36 | 1K Ohm |

| Designating Numeral | Resistance |
| --- | --- |
| 64 | 14K Ohms |
| 66 | 15K Ohms |
| 68 | 15K Ohms |
| 70 | 560K Ohms |
| 88 | 4.7K Ohms |
| 90 | 150 Ohms |
| 92 | 270 Ohms |
| 98 | 62 Ohms |
| 100 | .03 Ohms |
| 116 | 200 Ohms |
| 118 | 3.65K Ohms |
| 122 | 4.7K Ohms |
| 123 | 1K Ohm |

And, the capacitors have the following capacitances:

| Designating Numeral | Capacitance |
| --- | --- |
| 44 | 10 Microfarads |
| 46 | 10 Microfarads |
| 72 | 0.01 Microfarads |
| 124 | 1.0 Microfarads |

Further in the preferred embodiment, the transistors are preferably of the following types:

| Designating Numeral | Model No. | Manufacturer |
| --- | --- | --- |
| 86 | TIP30 | Motorola |
| 94 | TIP29 | Motorola |
| 96 | TIP35 | Motorola |
| 110 | MPSA56 | Motorola |
| 112 | MPSA06 | Motorola |
| 114 | MPSA56 | Motorola |

The preferred embodiment additionally includes the following diodes:

| Designating Numeral | Model No. | Manufacturer |
| --- | --- | --- |
| 38 | IN4742 | Motorola |
| 42 | IN4733 | Motorola |
| 109 | IN4004 | Motorola |
| 113 | IN4004 | Motorola |

Operation

Control 10 provides safe and efficient control for air conditioner clutch 20. Optionally, control 10 can be used in conjunction with a suitable heater control to provide total temperature control for the vehicle cab. Alternatively, control 10 can be adapted for use as a heater control rather than a cooling control.

In use, the driver selects by way of pot 50 the desired temperature within the vehicle cabin. The first voltage divider network of temperature comparator 54, namely resistors 66 and 68, provide a reference voltage of one-half of the supply voltage to noninverting input 60 of op amp 56. The second voltage divider network, namely elements 50, 52, and 64, is variable and depends upon the setting of pot 50 and the resistance of sensor 52. The temperature sensor 52 varies in resistance with changes in cabin temperature whereby the total resistance of pot 50 and sensor 52 changes with variations in resistance of sensor 52. As the temperature of sensor 52 decreases, the voltage on inverting input 58 of op amp 56 increases. When the voltage on the inverting input 58 is greater than the reference voltage on noninverting input 60, the voltage on output 62 of op amp 56 assumes a low level. Similarly, when the temperature of element 52 increases, the output voltage of op amp 56 will change to a high level when the voltage applied to inverting input 58 is less than the voltage applied to noninverting input 60. Thus, the output of op amp 56 is low when cooling is not required and is high when cooling is required.

Transistor 86 along with bias resistors 88 and 90 and resistor 92, form a voltage amplifier, which acts as a buffer between output 62 of op amp 56 and the output transistors 94 and 96. Since the output transistors are configured in a Darlington configuration, output transistor 94 saturates when conducting to keep the voltage drop across power circuit 16 to a minimum. Resistors 92 and 98 reduce current leakage when output transistors 94 and 96 are off. Resistor 100 provides minimum load for output transistor 96 in case of a short circuit through clutch 20. Diodes 109 and 113 protect the circuit from the reverse field condition that is created when the clutch 20 is switched off.

Short-circuit protection for clutch 20 is provided by protection circuit 18. Transistor 110 is biased such that there is a 0.4 volt drop across the collector-emitter junction. Transistor 112 provides current limiting protection for transistor 110. Transistor 114 is biased by transistor 110 to be 0.2 volt below its turn-on point. Resistor 100 senses or monitors the current flowing through output transistor 96. When the current exceeds seven amps indicative of a short circuit, a 0.2 volt drop is generated across resistor 100, such that transistor 114 is turned on. SCR 120 therefore fires after a short time delay, as determined by the R-C circuit 123, 124, to ground output line 32 of power source 12. Consequently, the supply voltage to op amp 56 is grounded which brings the base of transistor 86 low, which holds output transistor 96 off. SCR 120 continues to conduct until such time as voltage is removed from the entire circuit. Consequently, if a short is seen across clutch 20, current is interrupted to provide protection from fire or damage.

The above description is that of a preferred embodiment of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A vehicle cabin temperature control comprising:
   temperature selector means for selecting a reference temperature within the vehicle cabin;
   temperature comparison means responsive to the temperature selector means for outputting a control signal indicative of the relationship of the reference temperature and the actual temperature within the vehicle cabin;
   controllable switching means to be coupled between a power source and heating/cooling means, said switching means being responsive to the temperature comparison means for applying electrical power to the heating/cooling means when the control signal has a certain value; and
   short-circuit protection means coupled to said swithing means, said protection means including current detection means for monitoring the electrical current applied to the heating/cooling means, said protection means further including current interrupting means responsive to said current detection means for interrupting the current to the heating/cooling means when the current exceeds a preselected parameter, said current interrupting means including means for selectively forcing the control signal to a value other than the certain value, whereby said switching means does not apply power to the heating/cooling means.

2. A vehicle cabin temperature control as defined in claim 1 wherein:
   said temperature comparison means includes a voltage comparison means and power supply means for applying a reference voltage to said voltage comparison means; and
   said signal forcing means includes grounding means for selectively grounding said power supply means.

3. A vehicle cabin temperature control as defined in claim 1 wherein said current interruption means includes delay means for delaying interruption of the current for a period of time following the time at which the current exceeds the preselected parameter to accommodate line surges.

4. An improved vehicle cabin temperature control including thermostat means for emitting a thermostat signal responsive to a comparison of the desired cabin temperature and the actual cabin temperature, power supply means responsive to said thermostat means for selectively applying electrical power to a vehicle heating/cooling device when the thermostat signal is indicative of a need for heating/cooling, the improvement comprising short-circuit protection means comprising:
   current monitoring means responsive to the amount of electrical current applied to the heating/cooling device for producing a control signal indicative of the amount of current; and
   power interruption means responsive to said current monitoring means for interrupting the electrical power applied to the heating/cooling device when the control signal assumes an undesired value indicative of a short-circuit condition through the heating/cooling device, said power interruption means including means for causing the thermostat signal to assume a value indicative of no need for heating/cooling.

5. An improved vehicle cabin temperature control as defined in claim 4 wherein said power interruption means includes time delay means for delaying the interruption of the electrical power for a time period following the initial time at which the signal assumes an undesired value to accommodate line surges.

6. An improved vehicle cabin temperature control as defined in claim 4 wherein:
   the thermostat means includes voltage comparison means and supply means for applying a reference voltage to the voltage comparison means; and
   said causing means includes grounding means for grounding the supply means.

* * * * *

UNITED STATES PATENT AND TRADEMARK OFFICE
CERTIFICATE OF CORRECTION

PATENT NO. : 4,543,795

DATED : October 1, 1985

INVENTOR(S) : David R. Ward et al

It is certified that error appears in the above-identified patent and that said Letters Patent is hereby corrected as shown below:

Column 1, line 52:

"heat/cooling" should be -- heating/cooling --

Column 2, line 16:

"shor-circuit" should be --short-circuit--

Column 2, line 28:

"46" should be --36--

Column 2, line 29:

"lines" should be --line--

Column 3, line 8:

"resistor" should be --resistors--

Column 3, line 10:

"transistor" should be --transistors--

UNITED STATES PATENT AND TRADEMARK OFFICE
CERTIFICATE OF CORRECTION

PATENT NO. : 4,543,795

DATED : October 1, 1985

INVENTOR(S) : David R. Ward et al

It is certified that error appears in the above-identified patent and that said Letters Patent is hereby corrected as shown below:

Column 3, line 26:

"94" should be --84--

Column 6, lines 4 and 5:

"swithing" should be --switching--

Signed and Sealed this

Fourth Day of February 1986

[SEAL]

Attest:

DONALD J. QUIGG

Attesting Officer

Commissioner of Patents and Trademarks